UNITED STATES PATENT OFFICE.

GUSTAF HENRIK HULTMAN, OF STOCKHOLM, SWEDEN.

METHOD OF REMOVING IMPURITIES FROM COAL-GAS.

1,073,605. Specification of Letters Patent. Patented Sept. 23, 1913.

No Drawing. Application filed June 3, 1913. Serial No. 771,411.

*To all whom it may concern:*

Be it known that I, GUSTAF HENRIK HULTMAN, a subject of the King of Sweden, residing at St. Paulsgatan 31, Stockholm, Sweden, have invented new and useful Improvements in Methods for Removing Impurities from Coal-Gas, of which the following is a specification.

Ordinary illuminating gas contains among sulfur compounds partly sulfureted hydrogen which can be removed by means of hydrated iron oxids or lime in the usual manner, partly other sulfur compounds, chiefly consisting of carbon disulfid, and which it has so far been impossble to remove in a technically satisfactory manner. Pippig and Trachmann have proposed to wash the illuminating gas with amins, which in the washing process form chemical compounds with the carbon disulfid. These amins are properly dissolved in alcohol. This method has, however, not come into practical use. Partly the gain is very slight, and partly occurs in the reaction sulfureted hydrogen, which in some way or other has to be got rid of, and partly the amins used for washing cannot be completely regenerated. Anilin dissolved in alcohol has generally been made use of for washing. In the washing process the anilin then forms together with the carbon disulfid sulfocarbanilid and sulfureted hydrogen. In order to obtain a better result in the washing process, attempts have also been made in cooling the gas to a low temperature, with the intention of getting the sulfur compounds to condense before washing. But no very good results appear to have been obtained with this. Attempts to dissolve the amins in other substances than alcohol, with or without the addition of sulfur, metallic oxids, etc., have not led to any technically useful method. The absorption appears in the above-mentioned methods of procedure on an average to have amounted to 70%. Of the amin used not more than 70% can be recovered on the lines of the tests carried out. In this connection it has to be observed that the part of the amin which on account of the tension accompanies the gas, can only be recovered by washing the gas with sulfuric acid.

The present invention refers to a method for removing or recovering these sulfur compounds and other substances (*e. g.* benzol, naphthalene) by washing the illuminating gas or the coal gas in general with alcohol cooled to 0° or below, or with some other washing fluid cooled to the same temperature, which washing fluid possesses the same characteristic quality as alcohol of partly being able to prevent freezing of the moisture separated from the gas on account of the fall in the temperature, and partly to dissolve the said substances.

If illuminating gas is being washed with alcohol of an ordinary temperature, no good absorption of the sulfur compounds is obtained, although the latter are soluble in alcohol under all conditions. If we, however, carry out the washing process with alcohol cooled to −15 à −20° C., for example, we get a remarkably good absorption, and the washing can be done without being interfered with by the formation of ice, as the moisture separated from the gas blends with the alcohol without freezing. It is of importance that the washing fluid is cooled, so that washing actually takes place at a low temperature. The mere cooling of the gas does not produce the same good result. Tests made have proved that the absorption in these two cases is to each other as 8:5.

During the washing process, which is carried out in a suitable washer, the illuminating gas is saturated with alcohol which should be washed out with water in order to recover the same, either in a separate washer or in one built together with the first, In such a manner that part of the alcohol which accompanies the gas is entirely recovered. The washing fluids from the two washers are subjected in a proper way to fractional distillation, by which means the sulfur compounds are separated or recovered, as the case may be, and the entire quantity of alcohol recovered for further use in a proper way. To the washing fluid used may properly be added substances which form chemical compounds with the washing fluid or with those substances that are to be washed out, in order to produce better absorption and consequently better washing, or to facilitate further treatment of the washing fluid.

What I claim is:—

A method for removing impurities from coal gas (*e. g.* sulfur compounds, benzol, naphthalene), characterized by the coal gas being washed in alcohol cooled to 0° C. or below, partly to prevent freezing of the moisture separated from the gas on account of the low temperature, and partly to dissolve the said substances.

In testimony whereof I have signed my name to this specification in the presence of two subscribing witnesses.

GUSTAF HENRIK HULTMAN.

Witnesses:
J. F. A. RUTBACK,
FR. N. BLOMQUIST.